(12) United States Patent
Krogstad et al.

(10) Patent No.: US 7,855,753 B2
(45) Date of Patent: Dec. 21, 2010

(54) DIGITAL CORRECTION MODULE FOR VIDEO PROJECTOR

(76) Inventors: Knut Krogstad, Furubakken 11A, Hvalstad (NO) 1385; Johan Henrik Litleskare, Borgheim (NO); Randi Litleskare, legal representative, Brattasveien 55a, Notteroy (NO) N-3140

( * ) Notice: Subject to any disclaimer, the term of this patent is extended or adjusted under 35 U.S.C. 154(b) by 0 days.

(21) Appl. No.: 12/702,094

(22) Filed: Feb. 8, 2010

(65) Prior Publication Data

US 2010/0220247 A1 Sep. 2, 2010

Related U.S. Application Data

(60) Continuation of application No. 11/273,840, filed on Nov. 15, 2005, now Pat. No. 7,679,690, and a division of application No. 10/203,006, filed as application No. PCT/NO01/00027 on Jan. 25, 2001, now Pat. No. 6,999,133.

(30) Foreign Application Priority Data

Feb. 9, 2000 (NO) .................................. 20000656

(51) Int. Cl.
*H04N 3/223* (2006.01)
(52) U.S. Cl. ...................... 348/747; 348/746
(58) Field of Classification Search ......... 348/745–747, 348/806, 807, 674, 658, 383, 839, 840; 315/368.11, 315/368.13
See application file for complete search history.

(56) References Cited

U.S. PATENT DOCUMENTS

| | | | |
|---|---|---|---|
| 4,672,275 A | 6/1987 | Ando | |
| 4,974,073 A | 11/1990 | Inova | |
| 5,136,390 A | 8/1992 | Inova et al. | |
| 5,216,497 A | 6/1993 | Tsujihara et al. | |
| 5,386,253 A | 1/1995 | Fielding | |
| 5,506,481 A * | 4/1996 | Wada et al. | 315/368.12 |
| 5,592,240 A | 1/1997 | Sakamoto et al. | |
| 5,764,311 A | 6/1998 | Bonde et al. | |
| 5,793,340 A * | 8/1998 | Morita et al. | 345/7 |
| 5,793,447 A * | 8/1998 | Fujiwara et al. | 348/807 |
| 6,002,454 A | 12/1999 | Kajiwara et al. | |
| 6,310,662 B1 | 10/2001 | Sunakawa et al. | |
| 6,836,298 B2 | 12/2004 | Song et al. | |

FOREIGN PATENT DOCUMENTS

| | | |
|---|---|---|
| DE | 19822878 A1 | 11/1995 |
| EP | 0961255 A1 | 1/1999 |
| JP | 09-037197 | 2/1997 |
| JP | 9247498 A | 9/1997 |
| WO | 9929116 | 6/1999 |
| WO | 9931877 | 6/1999 |

OTHER PUBLICATIONS

Official Action issued in counterpart JP application 2001-557778 with English Translation.

* cited by examiner

*Primary Examiner*—M. Lee
(74) *Attorney, Agent, or Firm*—Duane Morris LLP

(57) ABSTRACT

A geometry correction module for a fixed pixel raster projector to project an image onto a projection surface is provided. The geometry correction module includes a receiver and a geometry corrector. The receiver collects an input pixels grid that represents an input image. The geometry corrector generates an output pixels grid representing an output image that compensates for the geometry of the projection surface by repositioning image data interpolated from at least two input pixels. The output image represents an altered input image that when projected onto the projection surface will display a correctly proportioned input image. A method of correcting geometry distortion when projecting an image is also provided.

14 Claims, 3 Drawing Sheets

DIGITAL CORRECTION MODULE FOR VIDEO PROJECTOR

CROSS REFERENCE TO RELATED APPLICATIONS

This application is a continuation of U.S. patent application Ser. No. 11/273,840 filed Nov. 15, 2005, which is a divisional of U.S. patent application Ser. No. 10/203,006, filed Aug. 5, 2002, which is now U.S. Pat. No. 6,999,133, which is based upon a PCT Application No. PCT/NO01/00027with an international filing date of Jan. 25, 2001, which is based upon a Norway application, Application No. 20000656, filed on Feb. 9, 2000, the entireties of which are incorporated by reference herein. Priority benefits are claimed under any or all of 35 U.S.C. §119(a)-(d) or (f), §120, or §365 based on said U.S., PCT and Norway application.

FIELD OF THE INVENTION

The present invention regards a correction module for a video projector.

BACKGROUND

The display of images on large screens, particularly curved screens, is today used in many areas with varying degrees of success. One of the problems with using several video projectors in order to create a large image is that differences arise in the boundary areas of the images of the respective projectors.

Among other things, large screen displays are used in simulators, e.g. for driving practice or within the entertainment industry. Lately, the prices of such systems have been greatly reduced, especially for the simulator system, which runs underlying physical models upon simulation, as well as instructor and/or student user interfaces. This cost reduction has been brought about as a result of the recent developments in PC technology.

Lately, the use of real-time 3-dimensional graphics in the entertainment industry has resulted in a greater volume of sales for such systems, which again has resulted in a great reduction in the price of image generators, in the order of from hundreds of thousands of dollars to a couple of thousand dollars.

This price reduction has made possible the purchase of more simulators, in order to allow a greater number of persons to undertake simulator training in areas where simulator training has been extensively used, such as in the military and aviation in general.

Thus, up until now, the greatest cost associated with simulators has been the projection system. New production technology results in cheaper projectors, however these are not of a type that can automatically be used in simulators.

In this connection, it should be noted that the projection scene for a simulator is typically constructed as front projection systems using one or more projectors (in some cases more than 10) to create a panorama image. In order to achieve a panorama image, it is necessary to project the image onto a curved screen by using several projectors arranged side by side and/or possibly on top of each other. The above cheap projectors are designed to display a single image on a flat screen, and are therefore not automatically suitable for display on a curved screen.

The effect of overlapping zones between the various projection images is critical for certain simulator applications, it being necessary to ensure a seamless transition from one image (channel) to an adjacent image. When viewing a multi-projector image, it is also important to control the color and intensity between the projectors in order to be able to compensate for varying intensities in the image.

A further problem may be the fact that the standard lens of the above projector is designed for display on a flat screen. Thus there will be a limit to how curved the screen may be before the loss of optical focus presents a problem.

The known and expensive technology makes use of CRT (cathode ray tube) projectors, which are expensive to purchase and which require constant re-calibration. This re-calibration takes place so often that it is necessary to have extra personnel present during the use of the simulator to perform frequent calibrations, which also makes the running of the simulator more expensive. One advantage of this known technology is the fact that there is no fixed pixel raster for CRT, i.e. the geometry may be compensated for within reason.

The new projector technology includes LCD (Liquid Crystal Display) and DMD (Digital Micromirror Device), which differ from conventional CRT (Catode Ray Tube) based projectors in that they are cheaper to buy and have a fixed pixel raster. The advantage of the fixed pixel raster is that it does not drift, thus making continuous realignment, as in the case of the CRT, unnecessary. One disadvantage however, is that the fixed pixel raster makes it impossible to compensate for the curved screen geometry. When using several CRT projectors, the images are easily distorted in order for them to appear seemingly correct on a curved screen.

None of the technologies mentioned have a built-in capability for giving a soft transition from one image to the next.

An ideal projector would compensate for all of the above effects. The main requirement however, would be to be able to generate the necessary geometry distortion, to be able to modulate the intensity (digital color modulation) for generating soft transitions from one image to the next, and compensate for a varying intensity across the image field. One of the aims of the present invention is to provide the above.

In order to avoid operational problems connected with analogue electronics, the correction must be performed digitally. This means that the correction must be carried out at a point where pixel data is available in a digital form, i.e. either in the field oscillator or in the actual projector.

The above is effected by a correction module as described herein. The correction module according to the invention may be installed as a plug-in module in existing projectors. The only requirement that must be fulfilled is that digital pixel data is available in real-time, so that the data stream may be retrieved and re-formatted by the correction module. Physically, the correction module can be designed as a PCB-board to be mounted on top of an existing printed circuit board in the projector.

The invention may, in addition to being used for projectors in a simulator, also be used in the entertainment business and similar, with one of several possible applications being described in greater detail in the following.

A simulator projection theatre may be seen as a special case of a video wall, i.e. a multi-projector system used in a simulator. Analyses have shown that the construction of a high quality video wall requires approximately the same functions as for application in a simulator, the main difference being that a simulator requires a curved screen.

Important features of a video wall are that it is simple to erect and install, and that there are no analogue operational problems. A soft transition from one image to the next, combined with removal of hot spots, will result in a large, high quality image, as the seams between the projections may be made virtually invisible.

The geometry correction will accelerate the setting up of the projector system, because the requirement for exact mechanical alignment has been reduced. Digital keystone correction allows great freedom with respect to the choice of projector/screen within the limits of optical focus.

Setting up the video wall, including the geometry alignment, is made simpler by use of simple control, e.g. via a PC, laptop, that addresses all or individual projectors. This will also allow configuration data to be backed up on a disk.

Typical video wall applications require complex video splitters for an accurate deduction of individual frames from the source signal. One advantage of the geometry correction circuit is that it can be used to deduct frames directly from the source signal, thus avoiding the need for an external splitter. Instead, a simple video buffer system or a chained structure is used to distribute the source signal to all of the projectors.

The system setting will set up all the projectors to derive their relevant frames including an overlap zone for blending.

DESCRIPTION OF THE FIGURES

In the following, the invention will be described in greater detail with reference to the drawings, in which.

DETAIL DESCRIPTION

The correction module according to the invention is to perform correction functions that are required in order to use a projector with a fixed raster for multi-channel projection on a non-flat screen. The term multi-channel is to be taken to mean the display of a plurality of frames, with each frame coming from a separate projector.

Projectors utilizing fixed rasters, such as DMD and LCD projectors, have no possibilities of distorting geometry by using convergence control, the way CRT projectors can.

A further requirement of multi-channel projector systems is the possibility of carrying out soft transition tuning and vignette correction in order to minimize variations in intensity within a channel and make the transition from one image to the next "seamless."

Furthermore, the correction module may also be used for smooth re-sampling of images having a different resolution from the output raster, for instance re-sampling of an SVGA (800×600) or SXGA (1280×1024) image to an XGA (1024× 768) high quality image without loss of lines or pixels.

Before taking a closer look at the construction of the actual correction module, its primary functions, i.e. geometry correction, soft transition tuning, vignette correction and gamma correction, will be described in greater detail:

Geometry correction: This correction is to allow non-linear re-imaging of the image in order to ensure that it appears correctly on a non-linear screen (curved screen or screen arranged at an angle). The user or control software can define any non-linear projection from an input pixel grid to an output pixel grid including trapezoidal distortion and non-linear distortions for curved screens.

The projection can be carried out by use of a network of control points (control network) placed no more than 4×4 pixels apart, which defines the projection to the new grid. Between the control points, the modules will perform a linear interpolation in order to derive the pixel co-ordinates for each pixel.

The accuracy of the pixel co-ordinates at the network points and between (interpolated) positions must (an absolute requirement) be equal to or better than ⅛ pixel.

In the projection process (re-sampling), the system must (absolute requirement) use bi-linear interpolation between the four closest pixels in the input grid when the calculation of the value for an output pixel is taking place. It is an absolute requirement that the interpolation be carried out with an accuracy of ⅛ pixel for the interpolation factors.

Figure 1:
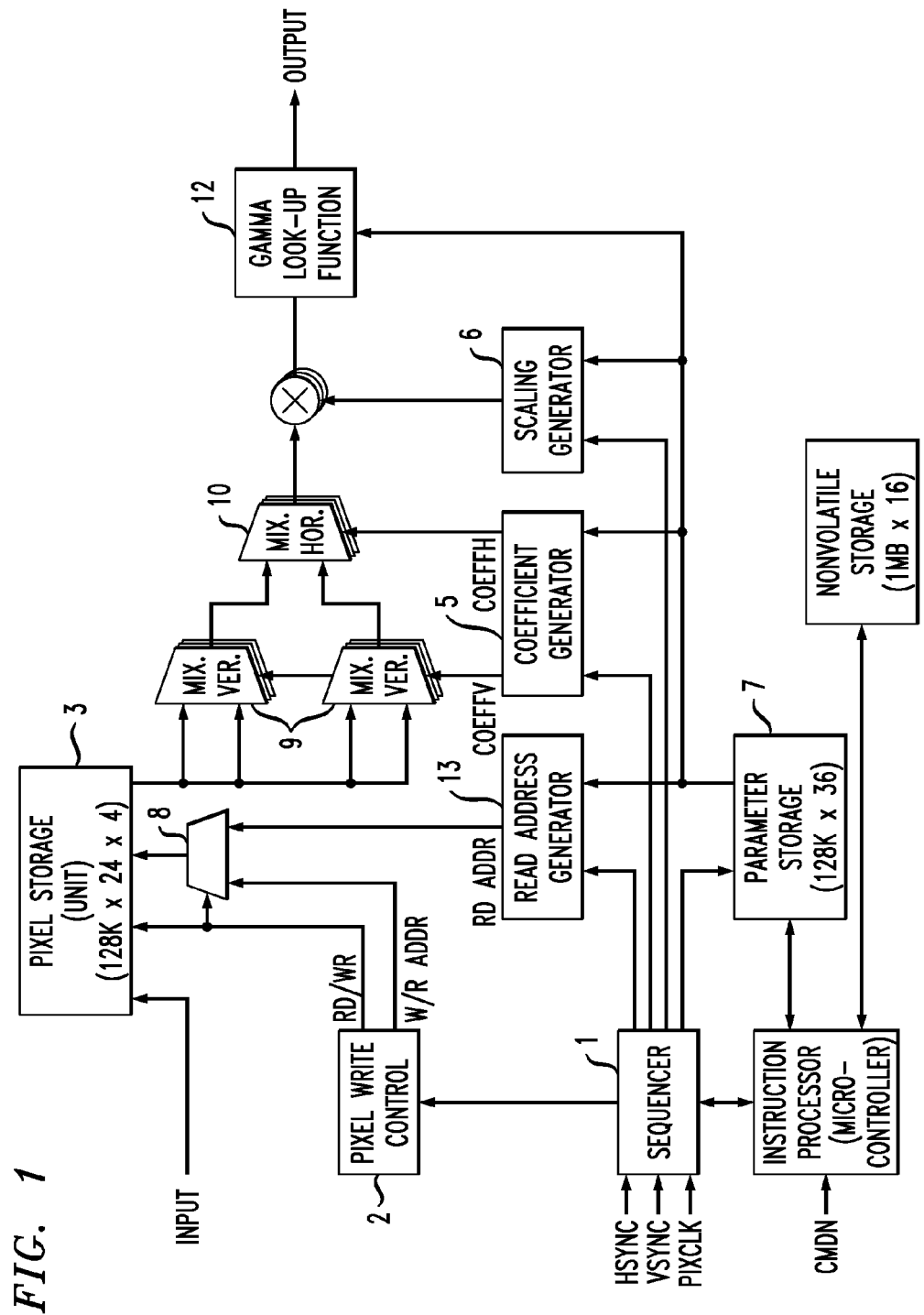
FIG. 1 shows a block diagram of the function of the correction module.
Figure 2:
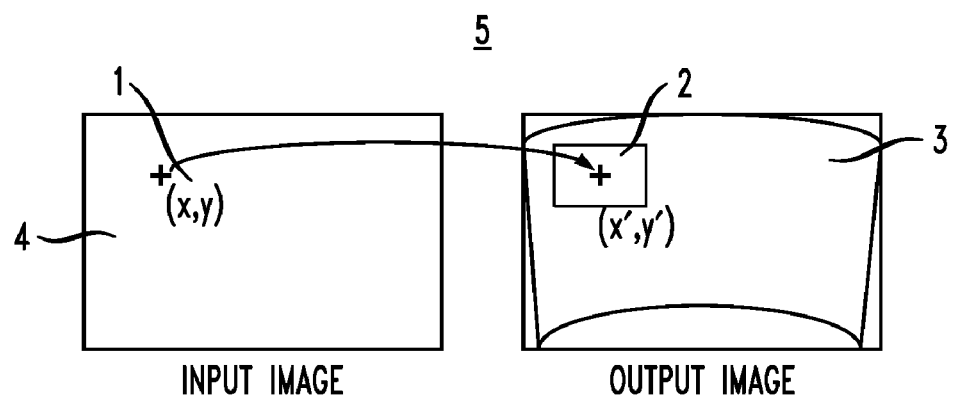
FIG. 2 schematically shows a pixel element in the input image and its transfer to the output image.
Figure 3:
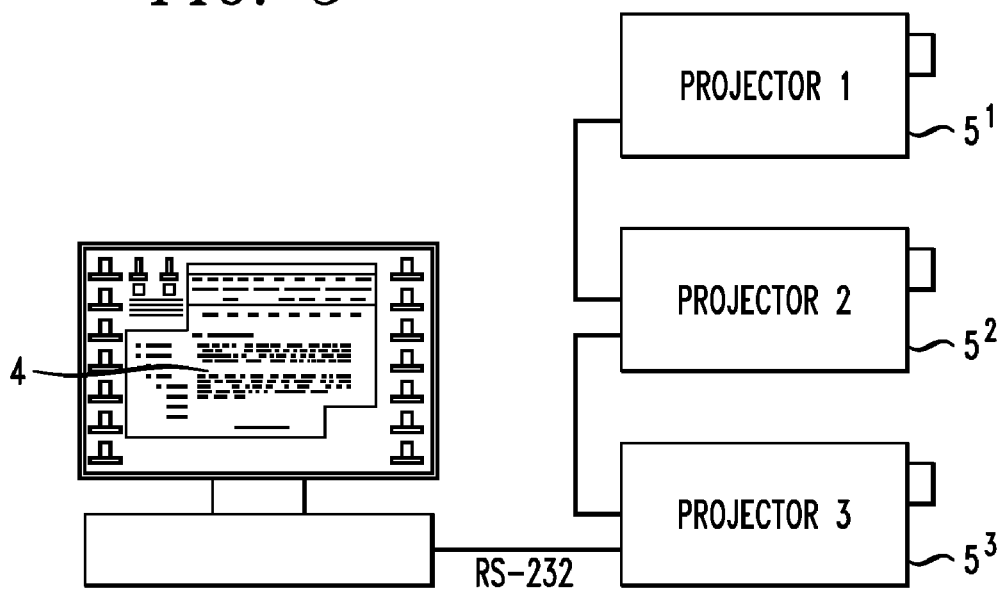
FIG. 3 schematically shows an example of projectors connected to an image source.

However there are practical limits to how much an image may be distorted. The limit of distortion is measured based on how much a pixel can be displaced on the screen 3 relative to its initial position. The maximum possible displacement is indicated in FIG. 1 by means of a rectangle 2 on the screen 3 around the initial pixel position.

The maximum allowable local and global displacement in the vertical direction is limited by the amount of pixel storage required to store a partial image for subsequent display. The local displacement in the horizontal direction is limited by how quickly pixels can be clocked out of the pixel storage unit and processed (if the image is compressed, the pixels must be clocked out and processed at a higher rate than the initial pixel clocking rate.)

The bi-linear sampling selected limits the quality of the re-sampled image if a scale-up or scale-down by a factor greater than 2 is performed.

Table I shows the limits in the vertical direction given by the size of the pixel storage unit (128 or 256 lines, however these parameters must not be considered absolute, as further practical experiments may result in further limits.)

TABLE I

| Parameters | Value |
| --- | --- |
| Max. horizontal displacement | Limited by pixel clock, i.e. magnification |
| Max. vertical displacement | 255/511 lines |
| Min. horizontal magnification | 5x local (1); 0.6-0.8x total for full quality (2) |
| Max. horizontal magnification | 2.0x |
| Min. vertical magnification | 0.5x local; 255/511 lines total compression (3) |
| Max. vertical magnification | 2.0x local; 255/511 lines total expansion (4) |
| Max. vertical non-linear | 255/511 lines (5) |

(1) Over any group of ≈ 32 pixles, as the average magnification must not exceed the total requirement below.
(2) Limited by pixel clock/internal clock conditions; the image must be clocked out at a higher rate than the pixel clock.
(3) Limited by the number of lines stored in the pixel storage unit; when the image is minimized, the remaining image lines are delayed in the pixel storage unit in order to compress the image.
(4) Limited by the number of lines stored in the pixel storage unit; when the image is magnified, the lower image lines are delayed in the pixel storage unit in order to expand the image.
(5) Limited by the number of lines stored in the pixel storage unit.

Compression/expansion may limit this further.

Soft transition tuning: The tuning function for a soft transition should preferably be performed prior to the geometry correction, and will use a similar network of control points in order to provide individual scaling of the input pixels as a function of the screen position. Each color component (R, G and B) is scaled separately. The scale factor is to be defined with at least a 9-bit resolution. For soft transition tuning, the control network must have control points spaced apart by a distance of no more than 4 pixels in the horizontal direction and up to 4 pixels in the vertical direction.

Vignette correction: The vignette correction is carried out at the same stage as the soft transition tuning correction, using the same circuit. An important feature of this correction is that it will compensate for the differences in intensity as a function of the position in the projected image, and it will compensate for variations in the perceived intensity caused by pixels covering different screen areas in the projector theatre.

The vignette correction is to be carried out with an accuracy of at least 9 bits in the calculation. This correction is to be allowed to scale the pixel values down by at least 25% relative to the full intensity. The control points for the vignette correction are to be spaced no more than 16×16 pixels apart. Each color component (R, G, B) is scaled separately.

It should be noted that both soft transition tuning and vignette correction imply scaling of the pixel values by a factor that is a function (x, y) position in the image. Even though the requirements in respect of accuracy and coefficient range can be implemented under the use of the same scaling function. The user (the technician for the set-up) should however regard the two functions as being separate.

Gamma correction: Gamma correction is performed by modifying the color values by means of the function e, in which c is the color component (normalized to the range 0-1) and γ is a constant depending on the transfer function of the projection device. The gamma correction is performed in order to give an approximately linear relationship between input values and the perceived output intensity, cf. FIG. 6.

The gamma correction function also includes control of black level and white point. The R, G and B components must be handled separately in order to compensate for variable projection characteristics and color balance.

The gamma correction may be implemented as a look-up table (or a set of 3 look-up tables) for the color components or by a pixel-wise linear interpolation function in order to provide a perception of constant intensity irrespective of how the re-sampled pixel grid matches the input grid. The gamma correction must be adjustable.

Referring to FIG. 1, the signal processing required to provide the above functions will be described in greater detail, FIG. 1 showing a sequencer 1 that initiates a number of events based on the signals HSYNC, VSYNC and PIXCLK from the image delivery unit. The sequencer includes a line delay counter that counts down to 0, a frame start register, a line counter that counts up and a status device for controlling the sequencing.

In the sequencer 1, the flank of the VSYNC signal initiates one new video frame. The frame start address is set to the next free address in the pixel storage unit 3. The pixel write control 2 is loaded with the new address and reset. The line delay control in the sequencer 1 is loaded with the specified input-to-output delay (number of lines).

In the sequencer 1, the flank of the HSYNC signal initiates a new video line and transmits the start of line signal to the pixel write control 2. If the line counter in the sequencer 1 is running, the start of line signal is transmitted to the read address generator 13, the coefficient generator 5 and the scaling generator 6.

When the line delay counter in the sequencer 1 reaches zero, the line counter starts up, and the reading from the parameter storage unit 7 and the flank of the output signal VSYNC is generated.

When the line counter reaches its maximum (equal to vertical resolution), the counter stops and transmits the end of frame signal to the pixel write control 2, the read address generator 13, the coefficient generator 5 and the scaling generator 6.

It should be noted that there may be overlap between the input and output generation, i.e. the output of previous frames is not finished before the next frame is initiated.

The pixel write control 2 contains an address generator that is incremented by 1 for each pixel coming in. The pixel write control 2 is loaded with a start address from the sequencer 1 at the start of each frame, and will count up for 1024 pixel clocks after each HSYNC.

Data in the parameter storage unit 7 is coded as absolute values for X, Y and RGB scaling factors at the start of every 4 lines. For each 4-pixel group in the lines, delta values (dX, dY, dR, dG, dB) are stored (incremented from previous values).

In order to decode the parameter storage unit data, the storage unit 7 contains a set of accumulators that generate absolute values for each pixel position based on the delta values. Each delta value is added 4 times in order to generate 4 absolute X, Y, R, G, B vectors before a new set of delta values is read from the storage unit 7.

The read address generator 13 receives a pair of X,Y co-ordinates from the parameter storage unit 7 for each pixel to be generated. The values in the X and Y accumulators are combined and added in an adder 8 together with the frame start address in order to give an address in the pixel storage unit 3. This address is used to look up the 4 closest pixels around the exact X,Y co-ordinate position.

Figure 4:
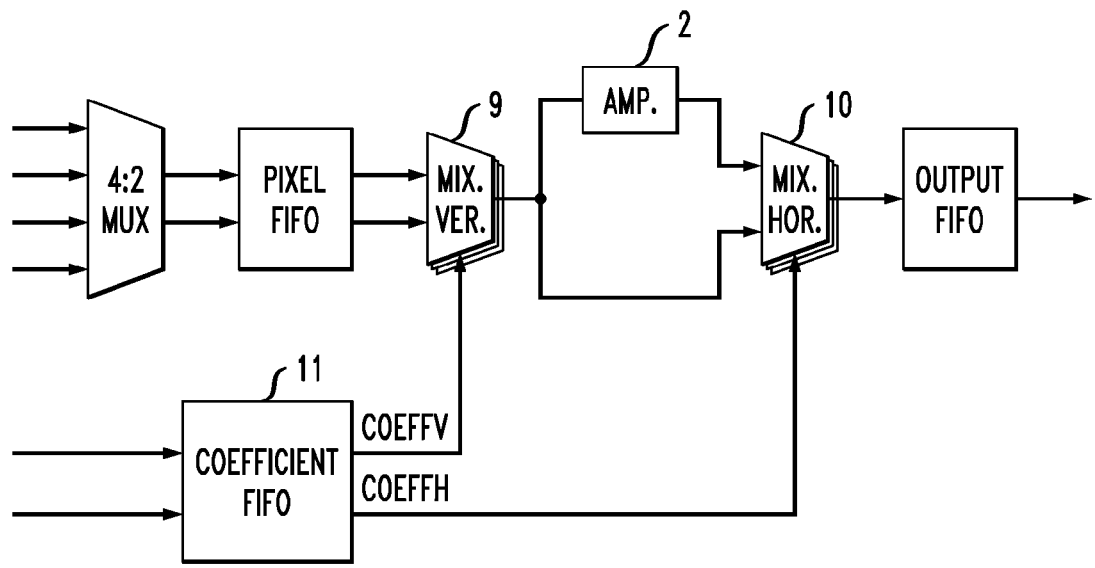
FIG. 4 shows a possible embodiment of the mixer stages in FIG. 2 in a block diagram.
Figure 5:
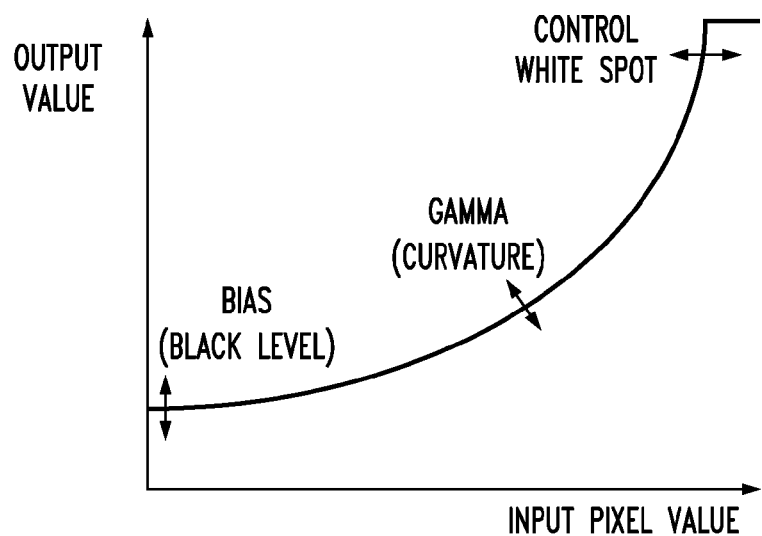
FIG. 5 shows a gamma correction curve.

The coefficient generator 5 receives fractions of the X,Y co-ordinates and generates weight coefficients for vertical and horizontal mixers 9, 10. That is, vertical mixer weights are frac(Y) and [1-frac(Y)], and horizontal mixer weights are frac(X) and [1-frac(X)]. The coefficient is delayed via a FIFO buffer (cf. reference number 11 in FIG. 4) in order to ensure that coefficient data arrives synchronously with pixels read from the pixel storage unit 3.

The scaling generator uses R, G and B data for each pixel read from the parameter storage unit 7, generating coefficients to be used for color scaling per pixel. This data is sent through the above FIFO buffer 11 as a mixer coefficient in order to be synchronized with pixel data.

The gamma look-up function 12 includes storage for storing a permanent gamma look-up table. This table is used to generate a non-linear output function in order to compensate for non-linearity in the projection device.

What is claimed is:

1. A geometry correction module, comprising:

a pixel storage unit configured to store a plurality of input pixels received from an image source, each of the input pixels including input pixel data;

a coefficient generator configured to generate horizontal and vertical weighting coefficients to apply to input pixel position data for adjusting a location of an output pixel on a projection surface;

horizontal and vertical mixer circuits configured to receive the horizontal and vertical weighting coefficients from the coefficient generator and to apply the horizontal and vertical weighting coefficients to the input pixel position data to produce modified pixel position data;

a scaling generator configured to generate color scaling coefficients to apply to input pixel color data for tuning a color of an output pixel on the projection surface;

a mixer circuit configured to receive the color scaling coefficients from the scaling generator and to apply the color scaling coefficients to input pixel color data to produce tuned pixel color data, wherein the geometry correction module includes an output configured to provide output pixels having modified pixel position data and tuned pixel color data to a projector for projecting on the projection surface.

2. The geometry correction module of claim 1, wherein the geometry of projection surface is non-linear.

3. The geometry correction module of claim 1, wherein the coefficient generator is configured to:
identify at least two output control points each corresponding to different positions in an output pixel grid, the output control points positioned to have at least one output pixel interposed therebetween,
select four input pixels to interpolate for each control point, and
calculate the horizontal and vertical weighting coefficients based on the interpolation.

4. The geometry correction module of claim 3, wherein the control points are positioned no more than four pixels apart.

5. The method of claim 4, wherein the control points and the output pixels have position accuracy of at least ⅛ pixel.

6. The geometry correction module of claim 1, further comprising a gamma correction means for compensating for non-linearity in the projector.

7. The geometry correction module of claim 6, wherein the gamma correction means includes a look-up table.

8. The geometry correction module of claim 1, wherein the scaling generator receives color data for each input pixel from a parameter storage unit and generates the color scaling coefficients.

9. A method of displaying an image on a projection surface, comprising:
storing a plurality of input pixels including color data and position data in a pixel storage unit;
generating horizontal and vertical weighting coefficients based on a control grid;
applying the horizontal and vertical weighting coefficients to position data retrieved from the pixels storage unit to provide interpolated position data;
applying color scaling coefficients to the color data to provide color-tuned pixel data; and
outputting a plurality of output pixels to a projector for displaying on a projection surface, the output pixel data including interpolated position data and color-tuned data.

10. The method of claim 9, wherein the geometry of projection surface is non-linear.

11. The method of claim 9, wherein generating the horizontal and vertical weighting coefficients includes:
identifying at least two output control points each corresponding to different positions in an output pixel grid, the output control points positioned to have at least one output pixel interposed therebetween;
selecting four input pixels to interpolate for each control point; and
calculating the weighting coefficients based on the interpolation.

12. The method of claim 9, further comprising accessing a look-up table to generate a gamma correction value to apply to the interpolated position data and color-tuned data.

13. The method of claim 11, wherein the control points are positioned no more than four pixels apart.

14. The method of claim 11, wherein the control points and the output pixels have position accuracy of at least ⅛ pixel.

* * * * *